US006953270B1

(12) United States Patent
Richardson

(10) Patent No.: US 6,953,270 B1
(45) Date of Patent: Oct. 11, 2005

(54) UNIVERSAL AUTOMATED YOKE FOR LIGHTING FIXTURES

(76) Inventor: Brian Edward Richardson, 18675-P Adams Ct., Morgan Hill, CA (US) 95037

( * ) Notice: Subject to any disclaimer, the term of this patent is extended or adjusted under 35 U.S.C. 154(b) by 90 days.

(21) Appl. No.: 10/439,056

(22) Filed: May 14, 2003

(51) Int. Cl.[7] .......................... B60Q 1/06; F21V 21/00
(52) U.S. Cl. ...................... 362/371; 362/419; 362/427; 362/430; 362/372; 362/428
(58) Field of Search ................................ 362/371, 368, 362/370, 418, 419, 427, 430, 372, 428

(56) References Cited

U.S. PATENT DOCUMENTS 1,781,372 A * 11/1930 Denecke .................. 248/125.3
4,463,413 A * 7/1984 Shirley ....................... 362/401
4,727,460 A * 2/1988 Payne ........................ 362/269
6,428,197 B1 * 8/2002 Downing .................... 362/523

FOREIGN PATENT DOCUMENTS

JP 01296502 A * 11/1989 .......... F21P 005/00

* cited by examiner

*Primary Examiner*—Sandra O'Shea
*Assistant Examiner*—Sharon Payne
(74) *Attorney, Agent, or Firm*—The Kline Law Firm

(57) ABSTRACT

A universal automated yoke that accommodates a variety of different sizes and types of lighting fixtures. The yoke includes adjustment mechanisms to accommodate a wide variety of sizes of lighting fixtures. The yoke further includes an adjustment mechanism to correct for various out of balance conditions of the lighting fixtures. The out of balance conditions are typically caused by added components, such as a color changer, that shift the balance point of the fixture. The device automates all the pan and tilt adjustments of the installed light fixture.

27 Claims, 9 Drawing Sheets

UNIVERSAL AUTOMATED YOKE FOR LIGHTING FIXTURES

BACKGROUND OF THE INVENTION

1. Field of the Invention

This invention relates generally to entertainment and architectural lighting, and more specifically is a device to control the pan and tilt of a plurality of different types of lighting fixtures.

2. Description of the Prior Art

Many different types of lighting fixtures are used in theater, television, touring productions, film production, and architectural applications. The fixtures are selectively used in varying combinations to obtain a desired artistic result. The fixtures vary in physical size, lamp wattage, lamp technology, operating temperature, lamp life, projected beam divergence angle, distribution of the light across the beam, color, and other attributes.

Some of the fixtures currently in use have automatic adjustment of at least some of the various attributes of the fixture, including some fixtures that have automated pan and tilt. However, most of the conventional fixtures currently in use do not have automated control of pan and tilt. The pan and tilt adjustment of the conventional fixtures must be done manually, a job which is often awkward, dangerous, and time consuming. It is most often impossible to make pan and/or tilt adjustments for dramatic effect and multitasking during a performance.

Prior art examples of fixtures that have numerous automated attribute adjustments, including pan and tilt adjustment, are disclosed in U.S. Pat. Nos. 4,914,556 and 6,048,080 by Richardson and Bellvieau respectively. The lights that were developed as a result of these inventions have specific applications that match their performance. But many desirable lighting characteristics, such as high output, long life, low output, and most importantly low cost are not are not provided by these fixtures. Fixtures that are highly automated have become more popular over the last twenty years, but fixed lights still constitute the majority of the fixtures used in theater, television, touring productions, film productions, and architectural applications.

Fixtures that are more popular than the partially automated fixtures for use in theater productions are described in U.S. Pat. No. 5,345,371, by Cunningham and Esakoff respectively. The lights that were developed as a result of these inventions were tailored to theater and touring type productions. These lights have no automated attributes as supplied by their manufactures.

Other manufacturers have developed automated add-on products to automate various attributes of the fixtures. One such device that is designed to automate pan and tilt is manufactured by City Theatrical of NY, and is called the AutoYoke. This product is expensive due to its relatively complex construction, and is difficult to use. Use of the product requires that the fixture be stripped of its yoke in order to be installed into the AutoYoke. Further, the device is manufactured for one specific lighting fixture. The yoke cannot be used on fixtures that are of a different size than the fixture for which the yoke is specifically designed. Lastly, if another attribute is automated, such as adding a color changer such as that disclosed in U.S. Pat. No. 6,142,652 by Richardson, the balance of the fixture is greatly effected.

Accordingly, it is an object of the present invention to provide a device that can automate pan and tilt adjustment of a conventional lighting fixture. The adjustment can be controlled by a user at a remote location or by a computer, or the device can be preprogrammed to perform specific effects.

It is a further object of the present invention to provide a device that can perform automated pan and tilt adjustment of a conventional lighting fixture even if the fixture is out of balance following initial installation.

It is a further object of the present invention to provide a device that is flexible enough to automate the pan and tilt adjustment of a large variety of different sized and shaped fixtures.

Lastly, it is an object of the present invention to allow easy assembly of a wide variety of fixtures in the automatic pan and tilt adjustment device.

SUMMARY OF THE INVENTION

The present invention is a universal automated yoke that accommodates a variety of different sizes and types of lighting fixtures. The yoke comprises adjustment means to accommodate a wide variety of sizes of lighting fixtures. The yoke further comprises adjustment means to correct for various out of balance conditions of the lighting fixtures. The out of balance conditions are typically caused by added components, such as a color changer, that shift the balance point of the fixture. The device automates all the pan and tilt adjustments of the installed light fixture.

An advantage of the present invention is that it provides automatic adjustment of pan and tilt properties while still allowing simple assembly of the lighting fixture.

Another advantage of the present invention is that the yoke itself is simple with few parts. The yoke is therefore inexpensive to manufacture and is reliable and easy to maintain.

These and other objectives and advantages of the present invention will become apparent to those skilled in the art, in view of the description of the best presently known mode of carrying out the invention as described herein and as illustrated in the drawings.

BRIEF DESCRIPTION OF THE DRAWINGS

FIG. 8 is a front view of the universal automated yoke with a small conventional lighting fixture.

DETAILED DESCRIPTION OF THE INVENTION

Figure 1:
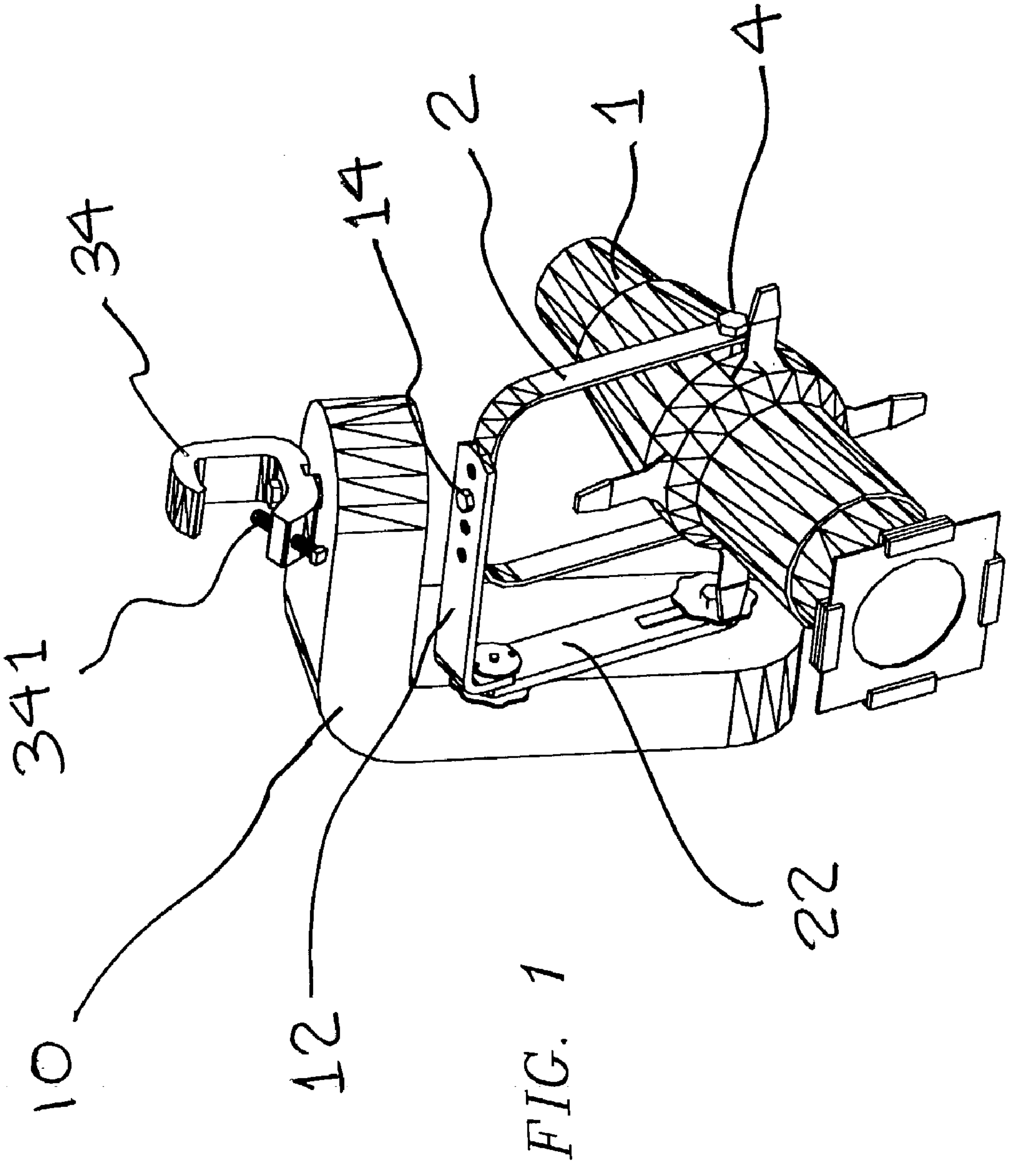
FIG. 1 is a perspective view of the universal automated yoke with a conventional lighting fixture installed.
Figure 3:
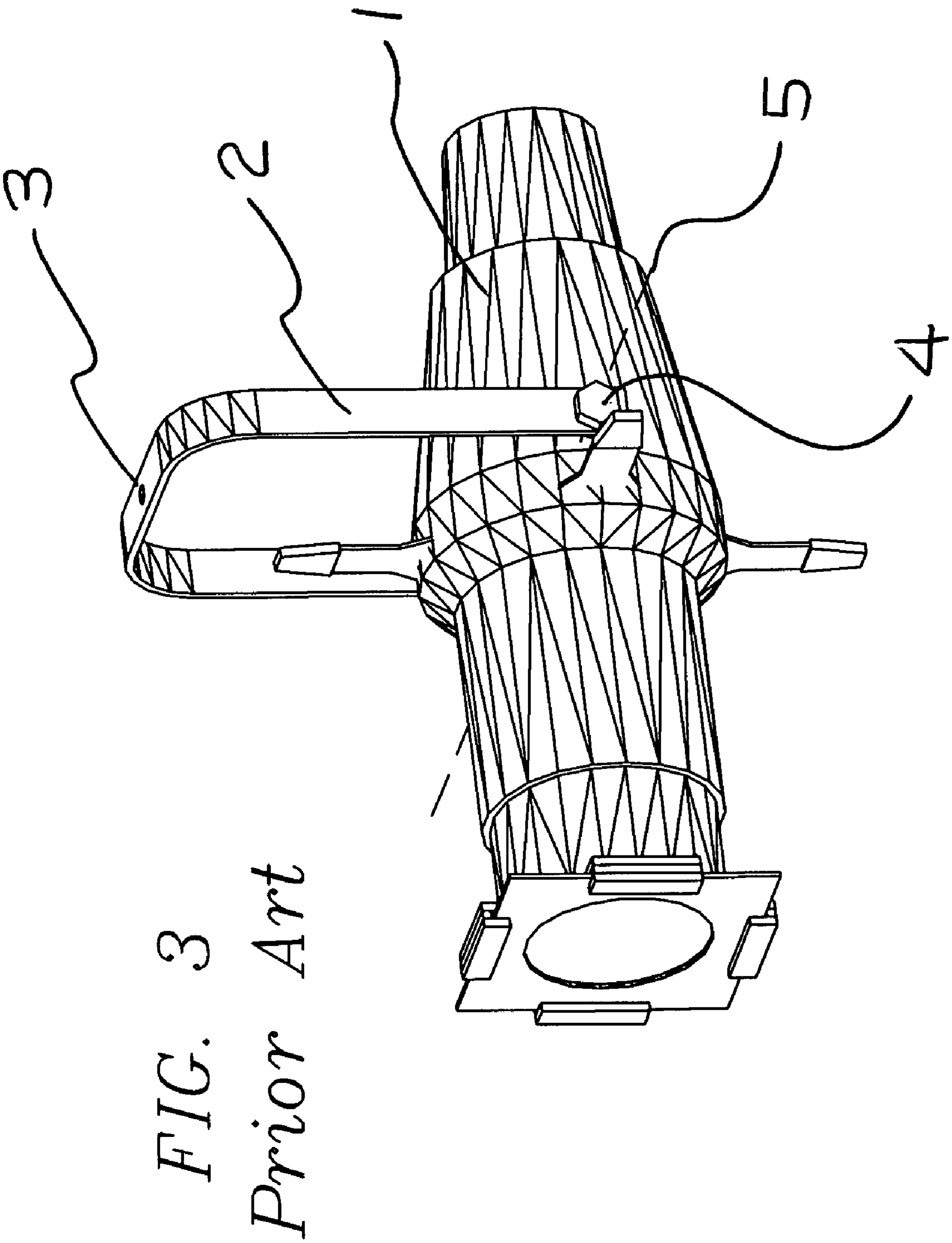
FIG. 3 Prior Art
FIG. 3 is a perspective view of a conventional lighting fixture.
Figure 8:
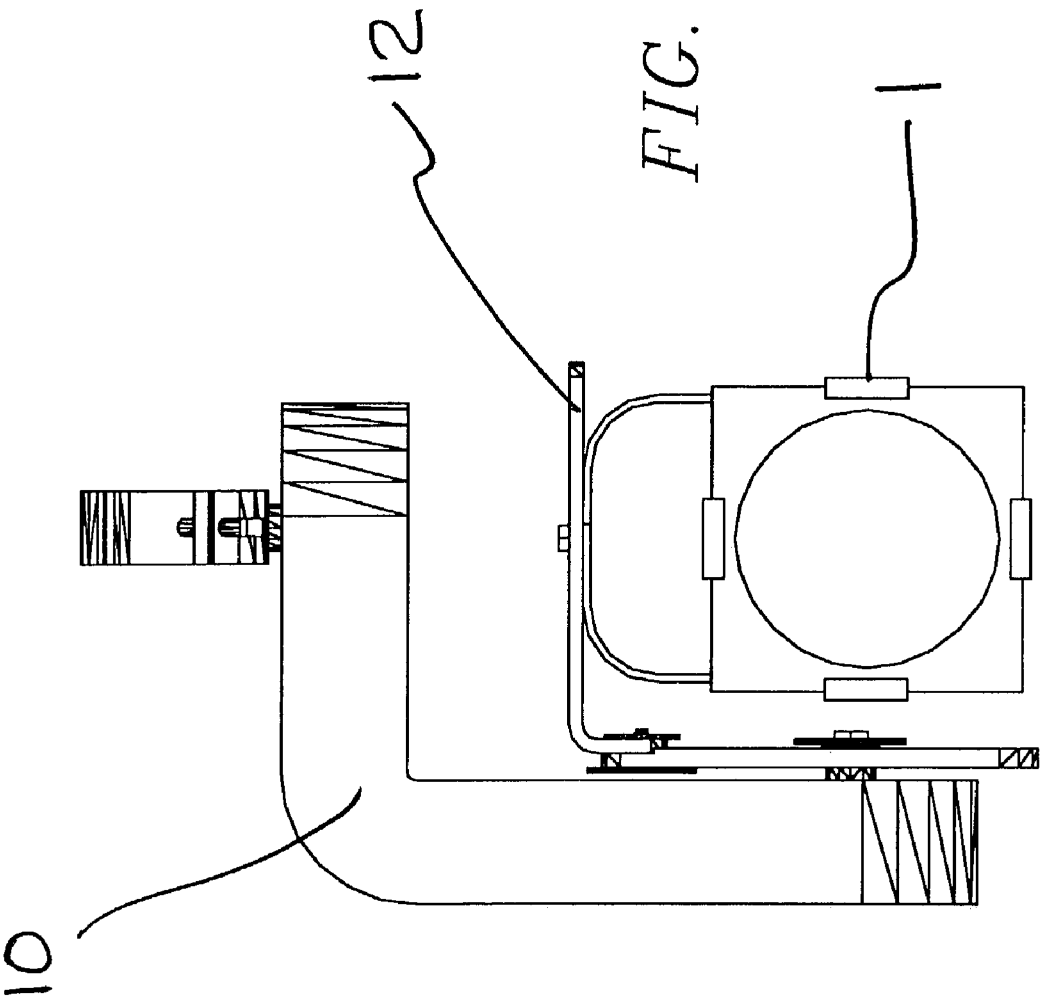
FIG. 8 is a perspective view of the universal automated yoke with a small conventional lighting fixture.
Figure 9:
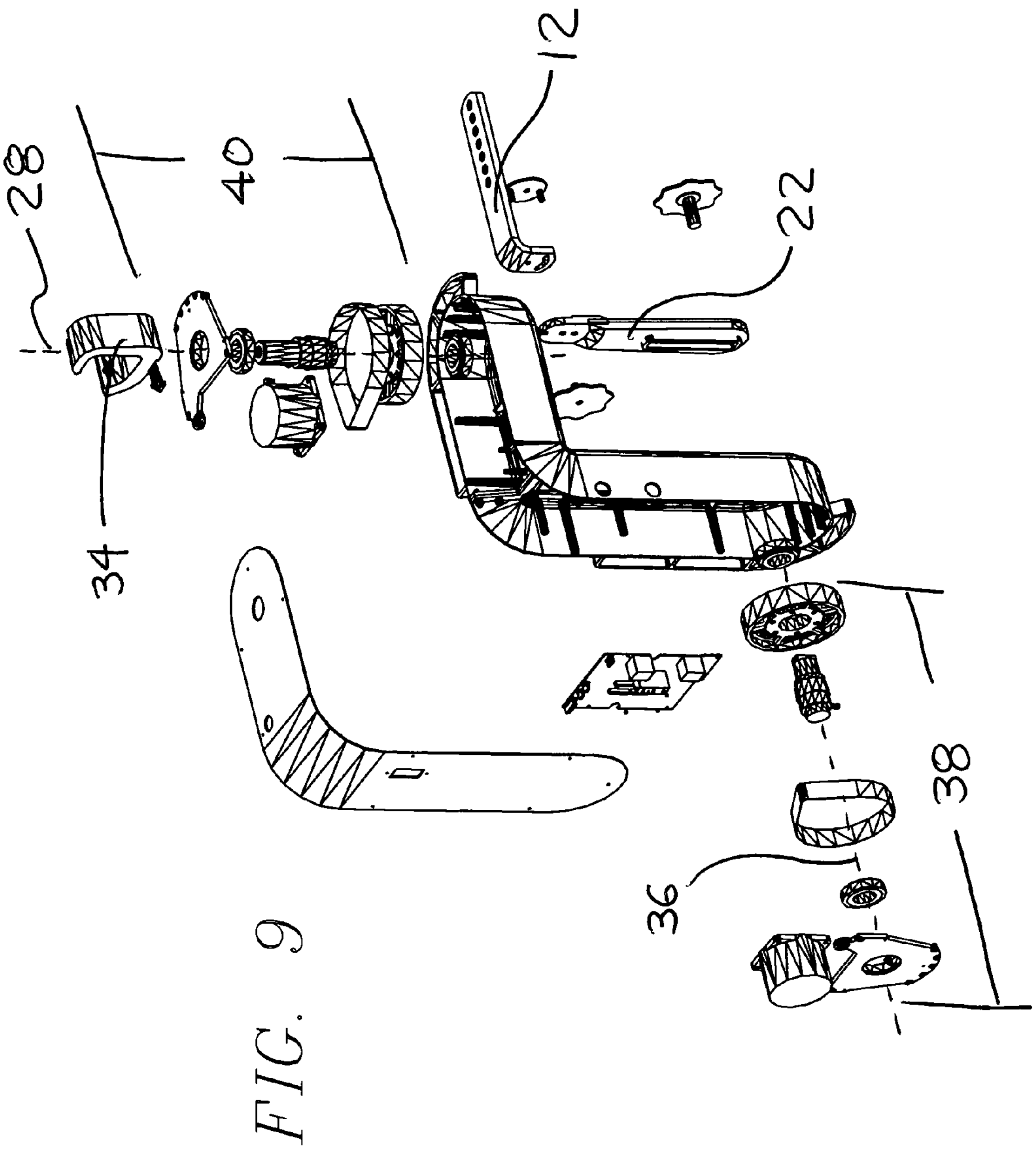
FIG. 9 is an exploded perspective view of the universal automated yoke.

The present invention is a universal automated yoke 10 that is adapted to be used in conjunction with a conventional lighting fixture 1. Referring first to FIGS. 1 and 3, the conventional lighting fixture 1 shown for reference is referred to as an ellipsoidal fixture. Ellipsoidal fixtures come in many sizes, as well as in many different variations manufactured by many companies. The universal automated yoke 10 of the present invention will accommodate lighting fixtures 1 of almost any type, and including a large range of sizes. Other types of fixtures that may easily be used in the universal automated yoke 10 include frenel, PAR (as shown in FIG. 8), and CYC to name just a few.

The conventional lighting fixture 1 includes a fixture yoke 2 that is typically formed in the shape of an inverted U. Referring now chiefly to FIG. 3, the fixture yoke 2 has a mounting hole 3 for hanging the fixture for a particular application. The hole 3 is located at the top of the fixture yoke 2 in a central portion. The ends of the fixture yoke 2 are pivotally attached to the lighting fixture 1 with pivot bolts 4. The pivotal attachment using the bolts 4 allows a user to manually tilt the lighting fixture 1. The two pivot bolts 4 form an axis of fixture tilt 5.

Figure 4:
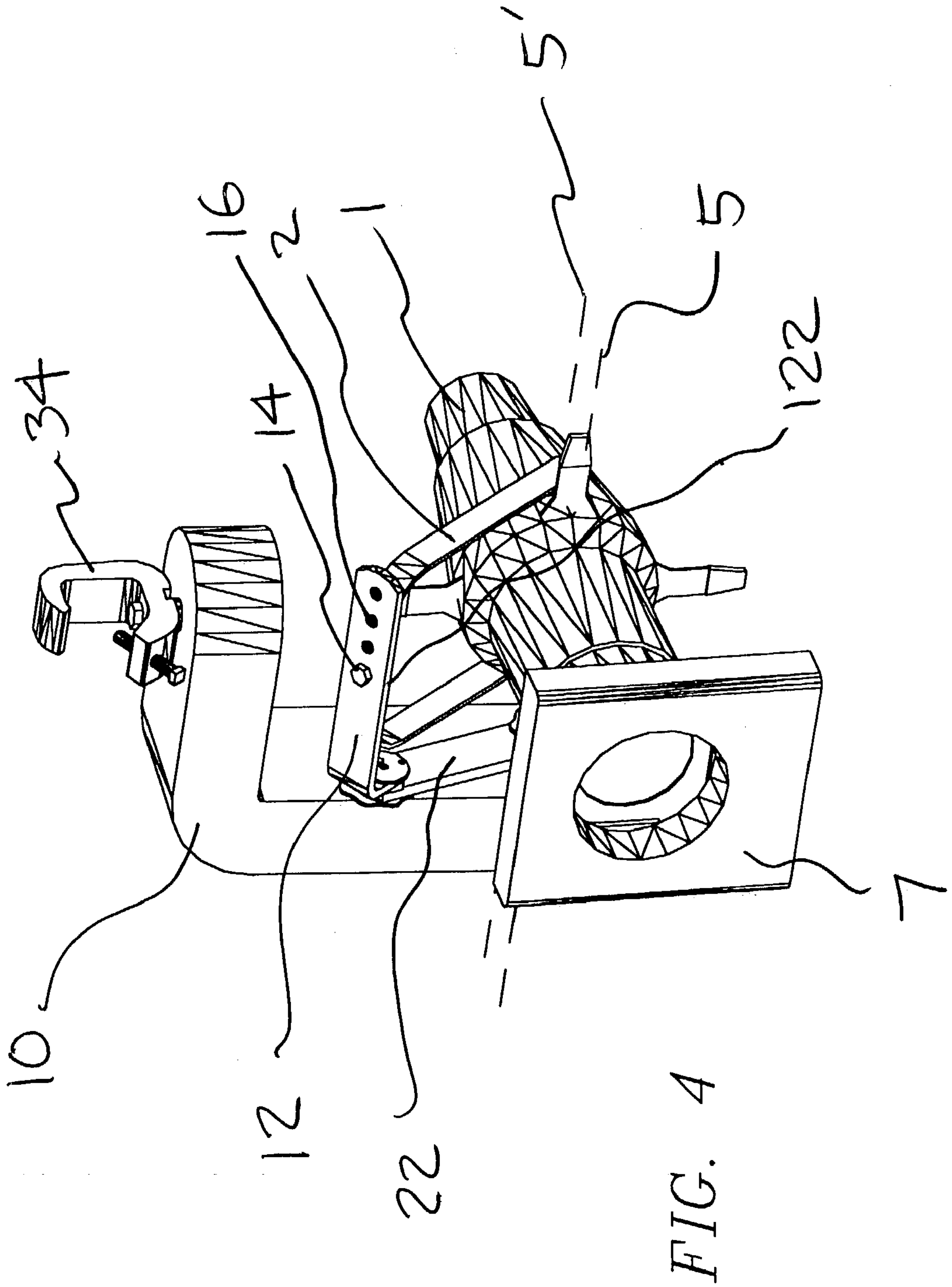
FIG. 4 is a perspective view of the universal automated yoke with a conventional lighting fixture and a color changer attached to the front of the lighting fixture.
Figure 5:
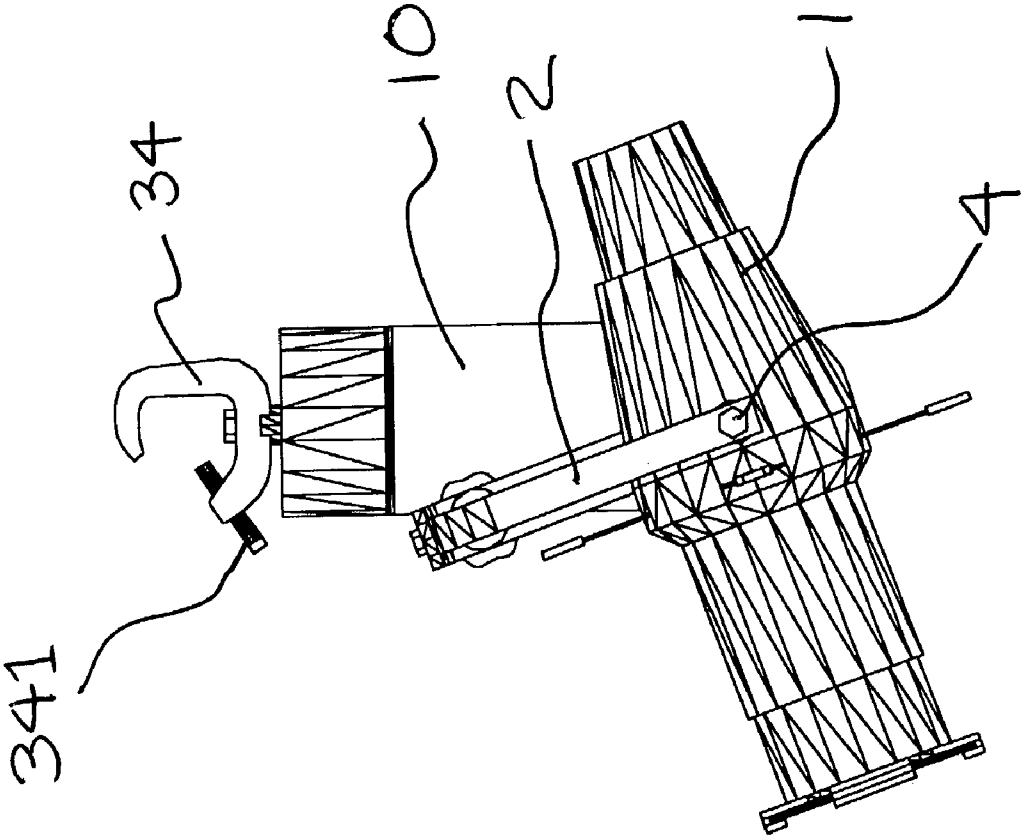
FIG. 5 is a side view of the universal automated yoke.
Figure 6:
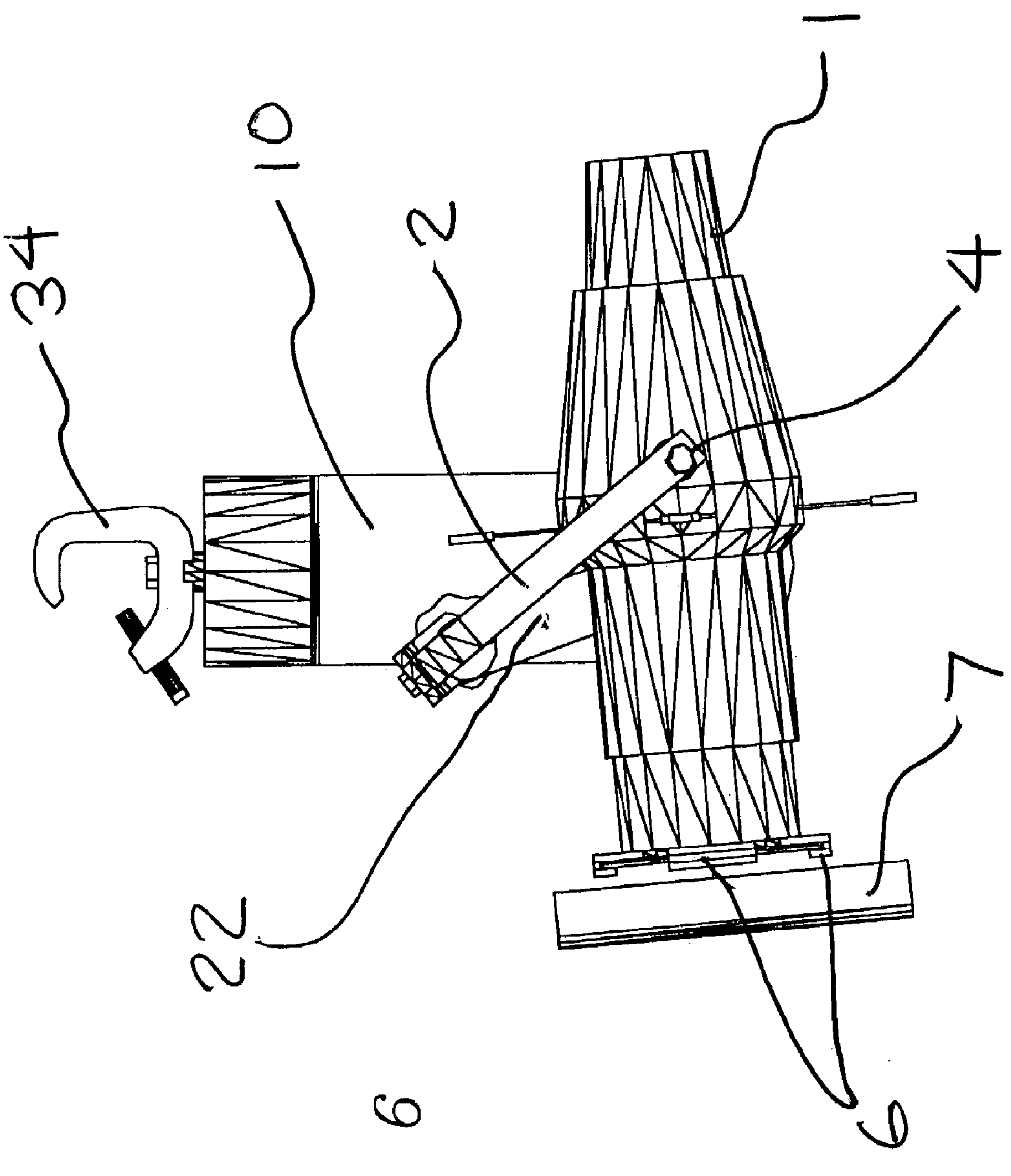
FIG. 6 is a side view of the universal automated yoke with a conventional lighting fixture installed.
Figure 7:
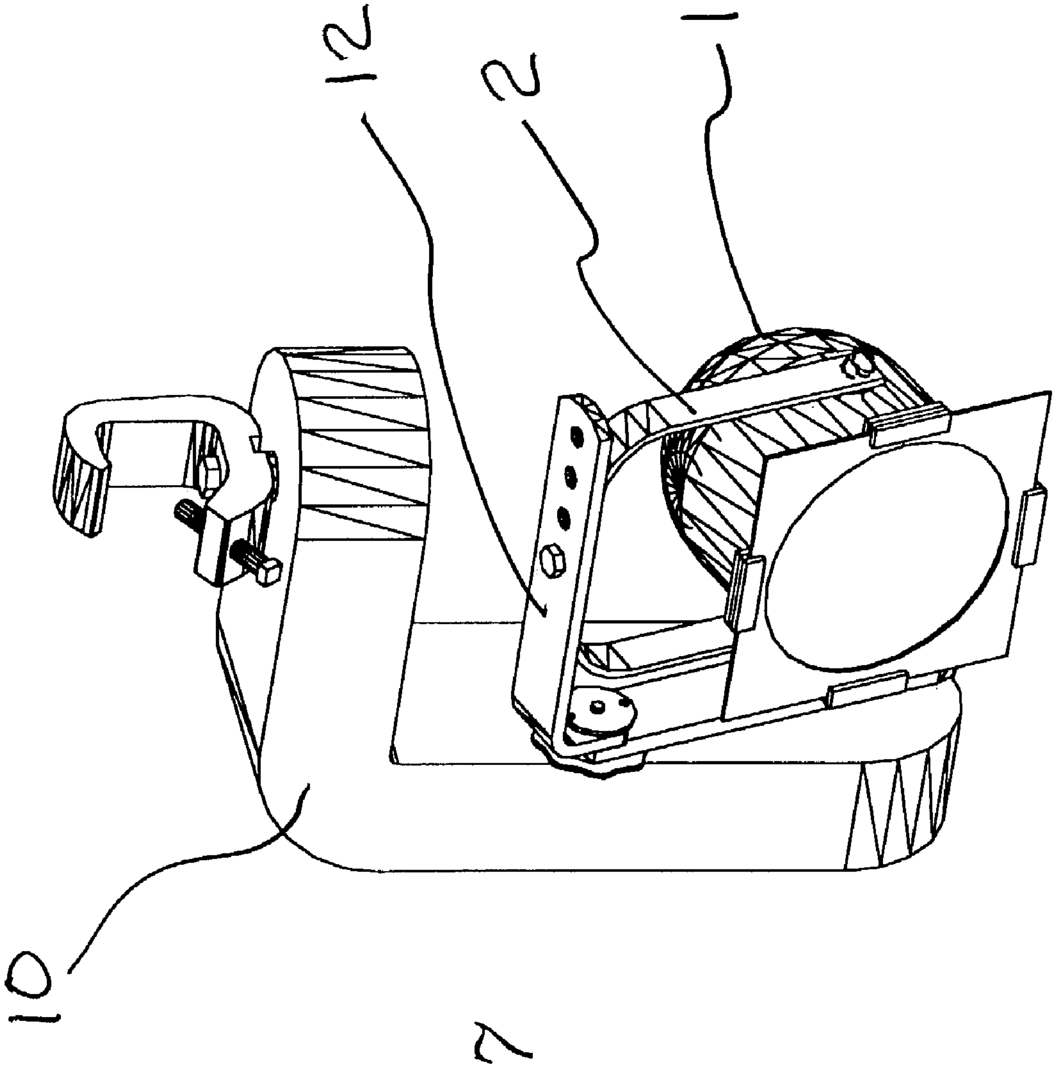
FIG. 7 is a side view of a universal automated yoke with a conventional lighting fixture with an added color changer.

The front portion of the conventional lighting fixture 1 has brackets 6 that allows a user to attach various accessories to the fixture 1, among which would typically be a color changer 7. FIG. 4 shows the color changer 7 attached to the conventional lighting fixture 1.

The yoke 2 of the lighting fixture 1 is attached to a horizontal member 12 of the universal automated yoke 10 using a securing bolt 14. The horizontal member 12 has a series of receiving holes 16 that accept the securing bolt 14. The series of holes 16 allows the universal automated yoke 10 to receive lighting fixtures 1 with a variety of widths, while maintaining the minimum overall width. The accommodation for various widths of fixtures 1 could also be accomplished by a slot or a number of other mechanical methods.

Figure 2:
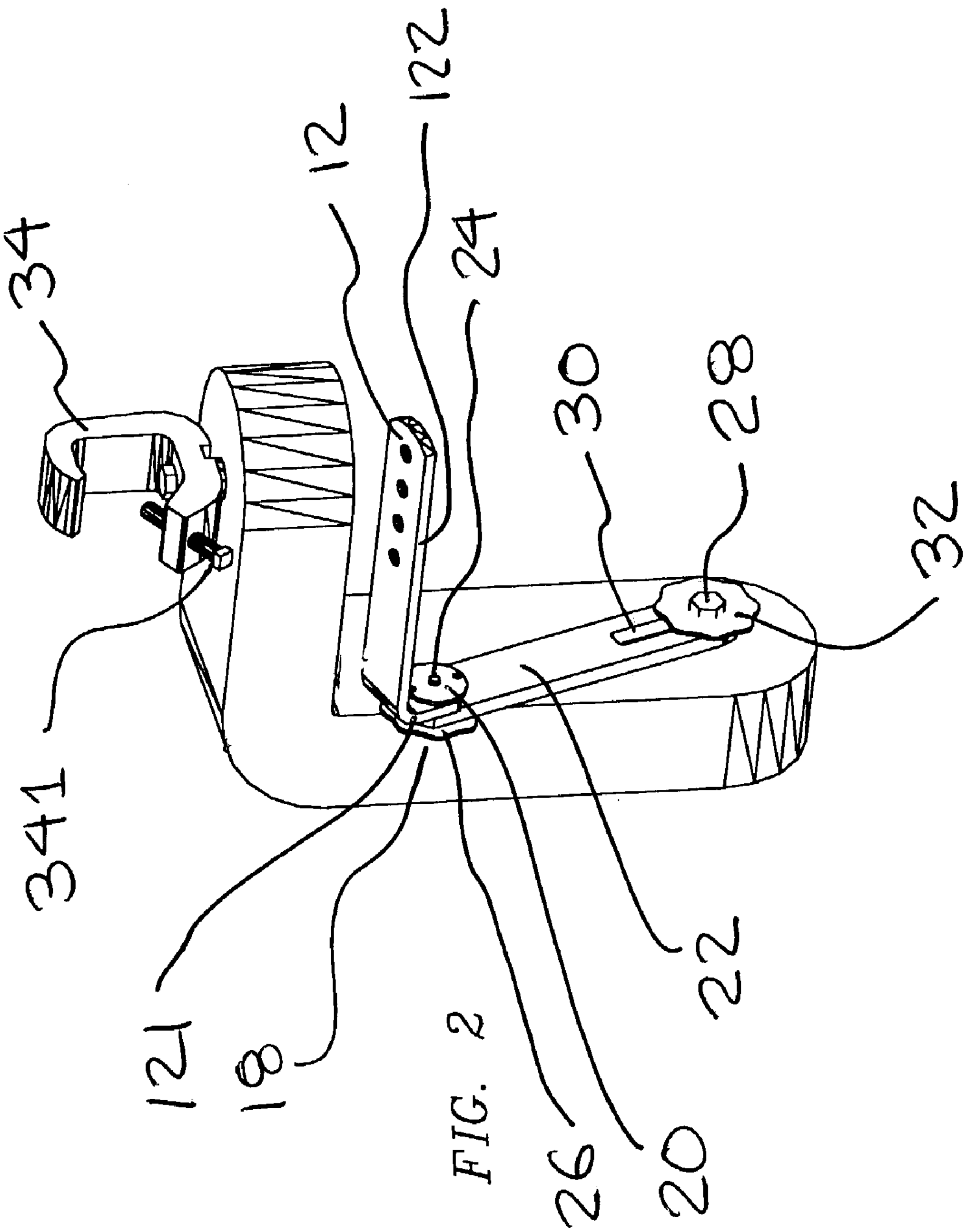
FIG. 2 is a perspective view of the yoke itself.

Referring now to FIG. 2, the horizontal member 12 of the universal automated yoke 10 extends past the width of the fixture 1. The inner end 121 of the horizontal member 12 is fastened to a balance adjustment means 18. The inner end 121 of the horizontal member 12 is sandwiched between a clamping disk 20 and a vertical member 22 of the automated yoke 10. The clamping disk 20 is affixed to a threaded stud 24 that is threaded through the disk 20 and through the inner end 121 of the horizontal member 12. The threaded stud 24 continues through the vertical member 22 and into a balance clamping knob 26. The clamping force applied to the horizontal member 12 can be reduced or increased by rotation of the knob 26.

The function of the balance adjustment means 18 can be readily seen in FIG. 4. In FIG. 4, the lighting fixture 1 has a color changer 7 attached. The added weight of the color changer 7 shifts the balance point of the fixture 1 toward the color changer 7, and rearward of the pivot bolts 4. To accommodate this shift of the balance point, the balance clamping knob 26 is loosened so that the horizontal member 12 can be rotated relative to the vertical member 22. This rotation moves the pivot bolts rearward relative to the vertical member 22, so that the modified axis of tilt 5' of the lighting fixture 1 is now aligned with the vertical member 22. This maintains the operating adjustment parameters of the automated yoke 10, i.e. when the yoke 10 is tilted 10°, the light fixture will also still be tilted 10°.

Referring now chiefly to FIG. 2, the inner end 121 of the horizontal member 12 (which is perpendicular to the main body 122 of the horizontal member 12) extends downward beyond the axis of rotation about a balance point of the lighting fixture 1. Near a point collinear with the axis of tilt 5, 5' about the balance point of the lighting fixture 1, the vertical member 22 is fastened to a tilt motion axle 28 of the yoke 10. The tilt motion axle 28 extends out of the housing of the universal yoke 10 at a lower end, and passes through a fixture size adjustment slot 30 in the vertical member 22. (Note that the size adjustment could as easily be accomplished by a series of holes or other known means.) The vertical member 22 is secured to the axle 28 by a tilt knob 32. Loosening tilt knob 32 allows the vertical member 22 to move relative to the tilt motion axle 28 so that the universal automated yoke 10 can accommodate lighting fixtures 1 with a large range of heights while still retaining balance about the axis of tilt 5, 5'. FIG. 8 shows the yoke 10 adjusted to accommodate the small PAR fixture mounted therein.

The universal automated yoke 10 is equipped with a mounting means 34 to position the yoke 10 at a desired location. In the preferred embodiment, the mounting means 34 is a clamp with a securing bolt 341 to attach the yoke 10 to the lighting infrastructure of the theater or other location where the device is to be used. A shaft extending out of the bottom of the mounting clamp 34 serves as a rotation axle 36.

A first drive means 38 serves to give the yoke 10 its rotating motion about rotation axle 36 by driving the yoke. A second drive means 40 is used to rotate the yoke 10 about the tilt motion axle 28 to the desired position for a particular effect. The position of the yoke relative to the rotation axle 36 and the tilt motion axle 28 can be fully automatically controlled by a computer in conjunction with a stepper motor, or any other known motion/position control means. The user can thus program the lighting effects to be implemented according to any timetable input by the user. More basic implementations can have the tilt position controlled simply by a remote switch or switches. While drive means 38 and 40 are shown as belt and pulley drives, it should be recognized that any known motion control drive means could be used for the first and second drive means 38 and 40.

The above disclosure is not intended as limiting. Those skilled in the art will readily observe that numerous modifications and alterations of the device may be made while retaining the teachings of the invention. Accordingly, the above disclosure should be construed as limited only by the restrictions of the appended claims.

I claim:

1. A positioning yoke adapted to control a position of a light fixture comprising:

a means for securing the light fixture in said yoke, a means for mounting said yoke at a desired location, a rotation axle to rotate said yoke in a first plane, a tilt motion axle to rotate said yoke in a second plane, a means for fixture width adjustment, said means for fixture width adjustment allowing light fixtures of various widths to be used in said yoke, and a remote control mechanism that controls motion of said yoke about said rotation axle and about said tilt motion axle; such that a direction of a projected beam of light can be moved in at least two planes, allowing a user to remotely control the direction of the projected beam of light.

2. The yoke defined in claim 1 wherein:

said means for width adjustment comprises a series of receiving holes in a horizontal section of said yoke.

3. The yoke defined in claim 1 wherein:

said means for width adjustment comprises a slot in a horizontal section of said yoke.

4. The yoke defined in claim 1 wherein:

said yoke further comprises a means for fixture height adjustment, said means for fixture height adjustment allowing light fixtures of various heights to be used in said yoke.

5. The yoke defined in claim 4 wherein:

said means for height adjustment comprises a slot in a vertical section of said yoke.

6. The yoke defined in claim 4 wherein:

said means for height adjustment comprises a series of holes in a vertical section of said yoke.

7. The yoke defined in claim 1 wherein:

said yoke further comprises a means for balance adjustment, said means for balance adjustment providing movement of a center of balance of the lighting fixture to be collinear with said tilt motion axle.

8. The yoke defined in claim 7 wherein:

said means for balance adjustment comprises an angle adjustment mechanism for a vertical section of said yoke.

9. The yoke defined in claim 1 wherein:

said remote control mechanism is controlled by a computer so as to fully automate movement of said yoke.

10. A positioning yoke adapted to control a position of a light fixture comprising:

a means for securing the light fixture in said yoke, a means for mounting said yoke at a desired location, a rotation axle to rotate said yoke in a first plane, a tilt motion axle to rotate said yoke in a second plane, a means for fixture height adjustment allowing light fixtures of various heights to be used in said yoke, and a remote control mechanism that controls motion of said yoke about said rotation axle and about said tilt motion axle; such that a direction of a projected beam of light can be moved in at least two planes, allowing a user to remotely control the direction of the projected beam of light.

11. The yoke defined in claim 10 wherein:

said yoke further comprises a means for fixture width adjustment, said means for fixture width adjustment allowing light fixtures of various widths to be used in said yoke.

12. The yoke defined in claim 11 wherein:

said means for width adjustment comprises a series of receiving holes in a horizontal section of said yoke.

13. The yoke defined in claim 11 wherein:

said means for width adjustment comprises a slot in a horizontal section of said yoke.

14. The yoke defined in claim 10 wherein:

said means for height adjustment comprises a slot in a vertical section of said yoke.

15. The yoke defined in claim 10 wherein:

said means for height adjustment comprises a series of holes in a vertical section of said yoke.

16. The yoke defined in claim 10 wherein:

said yoke further comprises a means for balance adjustment, said means for balance adjustment providing movement of a center of balance of the lighting fixture to be collinear with said tilt motion axle.

17. The yoke defined in claim 16 wherein:

said means for balance adjustment comprises an angle adjustment mechanism for a vertical section of said yoke.

18. The yoke defined in claim 10 wherein:

said remote control mechanism is controlled by a computer so as to fully automate movement of said yoke.

19. A positioning yoke adapted to control a position of a light fixture comprising:

a means for securing the light fixture in said yoke, a means for mounting said yoke at a desired location, a rotation axle to rotate said yoke in a first plane, a tilt motion axle to rotate said yoke in a second plane, a means for balance adjustment providing movement of a center of balance of the lighting fixture to be collinear with said tilt motion axle, and a remote control mechanism that controls motion of said yoke about said rotation axle and about said tilt motion axle; such that a direction of a projected beam of light can be moved in at least two planes, allowing a user to remotely control the direction of the projected beam of light.

20. The yoke defined in claim 19 wherein:

said yoke further comprises a means for fixture width adjustment, said means for fixture width adjustment allowing light fixtures of various widths to be used in said yoke.

21. The yoke defined in claim 20 wherein:

said means for width adjustment comprises a series of receiving holes in a horizontal section of said yoke.

22. The yoke defined in claim 20 wherein:

said means for width adjustment comprises a slot in a horizontal section of said yoke.

23. The yoke defined in claim 1 wherein:

said yoke further comprises a means for fixture height adjustment, said means for fixture height adjustment allowing light fixtures of various heights to be used in said yoke.

24. The yoke defined in claim 23 wherein:

said means for height adjustment comprises a slot in a vertical section of said yoke.

25. The yoke defined in claim 23 wherein:

said means for height adjustment comprises a series of holes in a vertical section of said yoke.

26. The yoke defined in claim 19 wherein:

said means for balance adjustment comprises an angle adjustment mechanism for a vertical section of said yoke.

27. The yoke defined in claim 19 wherein:

said remote control mechanism is controlled by a computer so as to fully automate movement of said yoke.

* * * * *